United States Patent [19]
Adams

[11] 3,964,762
[45] June 22, 1976

[54] FOLDING LUGGAGE CARRIER

[76] Inventor: John F. Adams, 55 Lee Road, Chestnut Hill, Mass. 02167

[22] Filed: Oct. 16, 1975

[21] Appl. No.: 622,989

Related U.S. Application Data

[63] Continuation of Ser. No. 490,904, July 22, 1974.

[52] U.S. Cl. .............................. 280/439; 280/79.1
[51] Int. Cl.² ........................................ B62B 3/04
[58] Field of Search ............ 280/36 R, 47.17, 47.34, 280/79.1, 79.2, 34 R, 34 B, 35; 190/18 A; 16/18 R

[56] References Cited
UNITED STATES PATENTS

| | | | |
|---|---|---|---|
| 1,019,114 | 3/1912 | Zarling | 280/35 |
| 2,177,153 | 10/1939 | Ross et al. | 280/36 R |
| 2,650,105 | 8/1953 | Costikyan | 280/35 |
| 2,729,843 | 1/1956 | Seek | 16/18 R |
| 3,871,676 | 3/1975 | Renard et al. | 280/35 |

Primary Examiner—M. H. Wood, Jr.
Assistant Examiner—Michael J. Forman
Attorney, Agent, or Firm—Thompson, Birch, Gauthier & Samuels

[57] ABSTRACT

A luggage carrier which includes a small folding horizontal platform upon which suitcases are secured. The platform is mounted on wheels and has a pull cord with which the traveler can pull the loaded carrier from place to place. When not in use, the carrier may be folded into a slender, easily stowable package.

6 Claims, 4 Drawing Figures

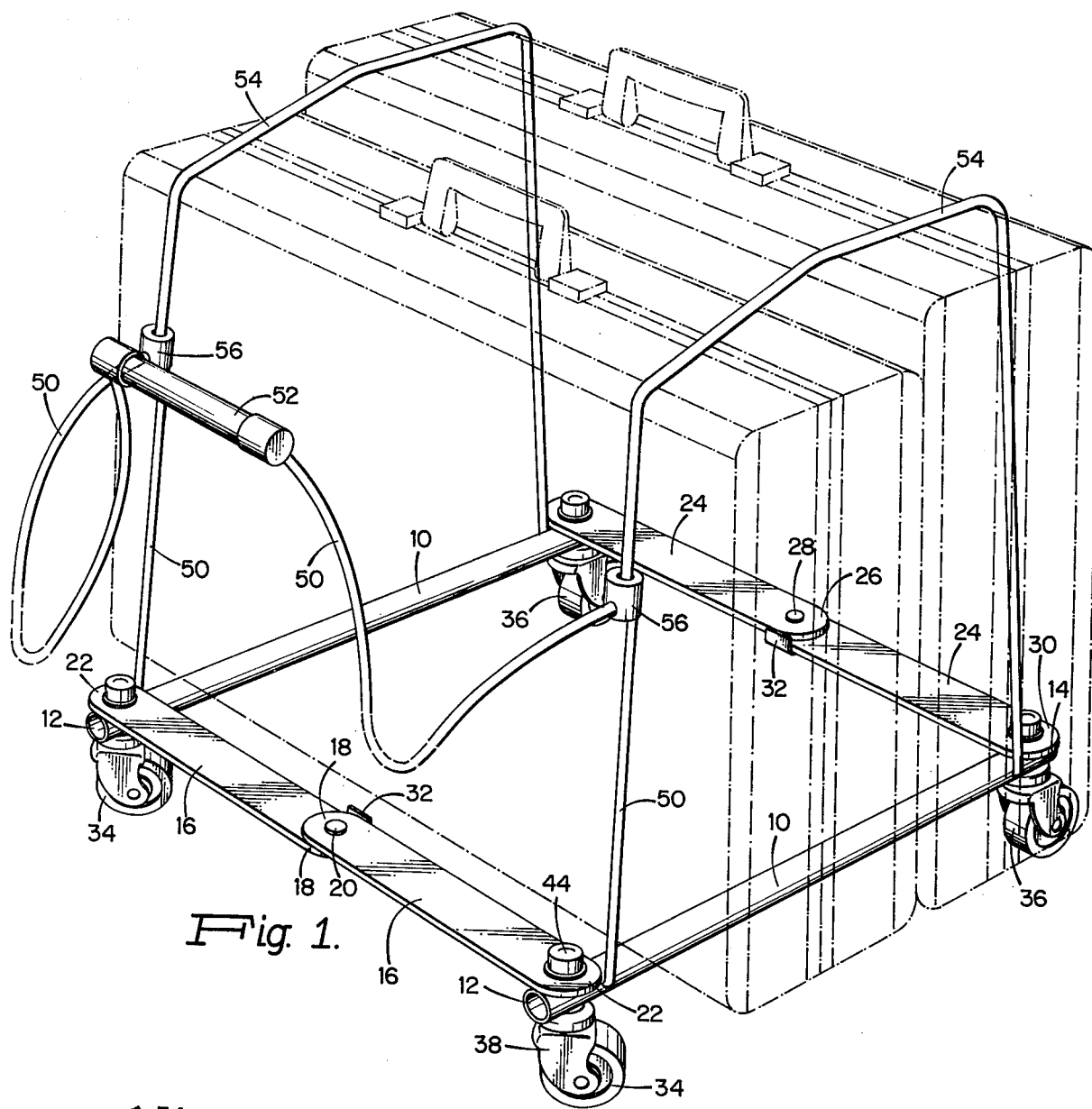
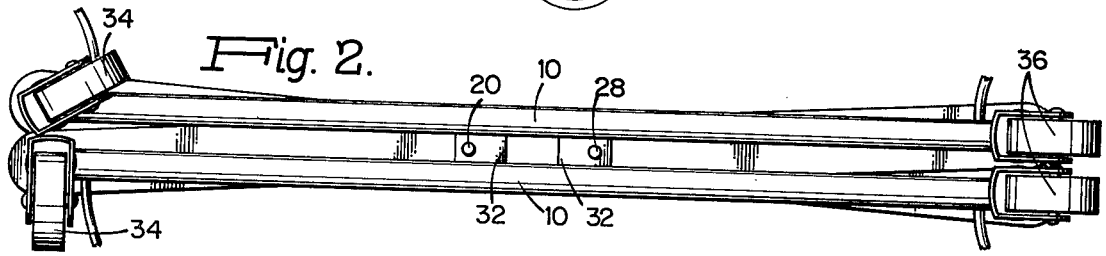
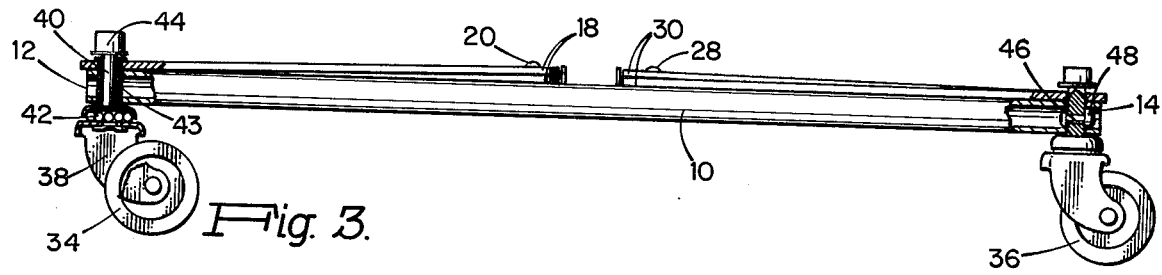

3,964,762

FOLDING LUGGAGE CARRIER

This is a continuation of application Ser. No. 490,904, filed July 22, 1974.

BACKGROUND OF THE INVENTION

Travelers on buses, trains, airplanes, and the like are frequently burdened with the job of carrying heavy suitcases to and from their means of transportation. This unpleasant job is particularly burdensome for women and older travelers. Travelers with heavy suitcases have often strained their muscles or even caused more serious injuries trying to carry (and often hurry with) their heavy luggage.

The need has long existed for a device which could be used by the traveler to transport such heavy luggage from place to place which requires only a small effort to be exerted by the traveler.

It is an object of this invention to provide a luggage carrier upon which luggage can be secured, which can be pulled with little effort, which is lightweight, which is quiet, which does not mar the luggage, and which is quite inexpensive to manufacture.

It is a further object of this invention to provide a luggage carrier which, when not in use, can be folded into a slender package that may be carried by the traveler or may be easily stowed in the luggage or elsewhere.

SUMMARY OF THE INVENTION

The preferred embodiment of the luggage carrier of this invention includes a luggage carrying platform formed by two straight tubular side rails which are joined by a front linkage and a rear linkage to create a rectangle. Luggage is secured upon the upper surface of the platform by elastic tiedown cords.

Wheels are mounted beneath the platform to provide mobility and a pull cord is provided so that the traveler can pull the loaded luggage carrier, as if he were pulling a child's wagon.

The front and rear linkage is foldable to draw the side rails together. Thus, when not in use, the luggage carrier may be folded into a slender package for convenient stowage.

DESCRIPTION OF THE DRAWINGS

FIG. 1 is a perspective view of the preferred embodiment of the luggage carrier (with the suitcases shown by the dotted lines).

FIG. 2 is a bottom view of the luggage carrier of FIG. 1 shown in its folded or non-use position.

FIG. 3 is a side view of the luggage carrier shown in FIG. 2, with portions cut away to better illustrate the wheel mounting arrangement.

DESCRIPTION OF THE TWO EMBODIMENTS

Figure 4:
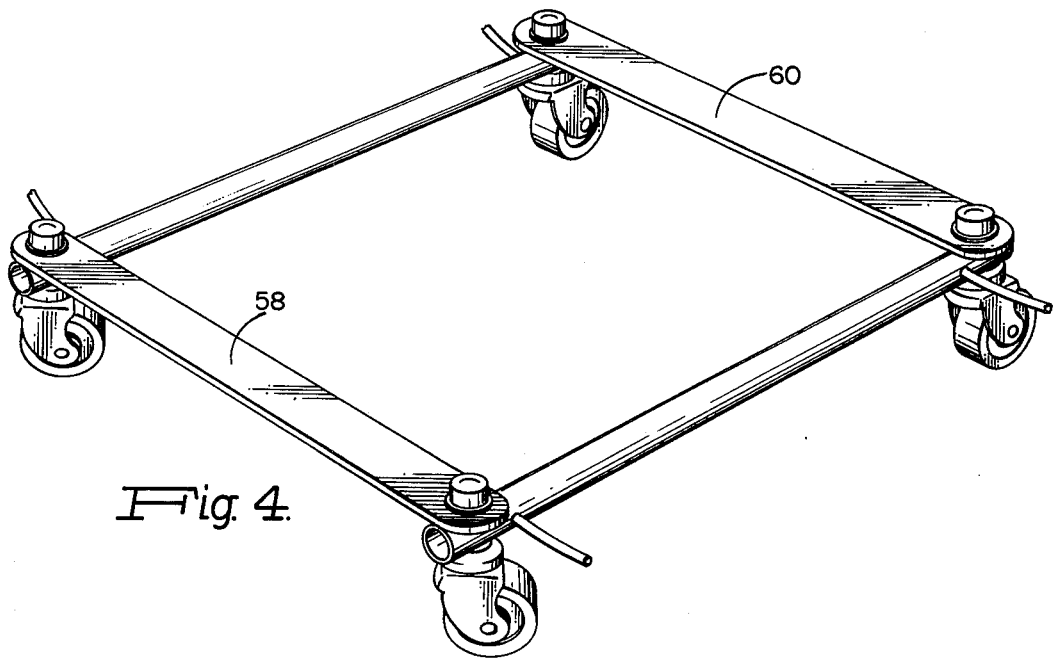
FIG. 4 is a perspective view of a modified embodiment of the luggage carrier.

The preferred embodiment of the luggage carrier of this invention is shown in FIG. 1. A pair of spaced apart, hollow, tubular aluminum side rails 10 are maintained parallel to each other in the use position and have front ends 12 and rear ends 14. The side rails 10 are the primary load carrying members of the luggage carrier.

A pair of front links 16 having inner ends 18 are pivoted together by pivot pin 20. The outer ends 22 of the front links 16 are pivoted to the front ends 12 of the side rails 10. A pair of rear links 24 having inner ends 26 are pivoted together by pivot pin 28. The outer ends 30 of the rear links 24 are pivoted to the rear ends 14 of the side rails 10.

In the use position shown in FIG. 1, the front and rear links are straight and parallel to each other and perpendicular to side rails 10. Thus, a rectangular luggage carrying platform is formed by the side rails and the front and rear links. To prevent the links from folding outwardly beyond the position shown in FIG. 1 (i.e. with pivot pins 20 and 28 moving away from each other), stops 32 are fixed to inner ends 18 and 26. Stops 32 serve to maintain the links in the FIG. 1 configuration.

The luggage carrying platform is provided with mobility by front wheels 34 which are mounted beneath the front ends 12 of side rails 10, and by rear wheels 36 which are mounted beneath the rear ends 14 of side rails 10. Front wheels 34 are mounted to swivel about a vertical axis, and rear wheels 36 are mounted in a fixed position in alignment with side rails 10. This is shown in FIGS. 1 and 2.

The means by which the wheels and the pivoting links are mounted to the side rails will now be described in detail. FIG. 3 shows that the front wheel 34 is carried by a wheel housing 38 which in turn is carried by a vertical pin 40 which is fixed to the wheel housing at the lower end of the pin. A ball bearing unit 42 is carried on the vertical pin 40 immediately above the wheel housing. In order to pivotally attach both the front wheel and the front link, a vertical hole is provided in the front end 12 of the side rail 10, and a vertical hole is provided in the outer end 22 of the front link 16. The two vertical holes are aligned (with the link above the side rail) and a hollow rivet 43 is inserted into the aligned holes. The rivet is flanged at its top and bottom and pivotally pins the front link to the side rail in a secure fashion.

The vertical pin 40 is passed upwardly through hollow rivet 43 and is fixed against downward displacement by a cap fastener 44 which is driven on and is held tightly to the pin by a friction fit. The inside walls of the hollow rivet act as a bearing surface against which pin 40 can swivel. Pin 40 has a sufficient length to provide clearance between the bottom of cap fastener 44 and the top of the double flanged rivet 43. This arrangement prevents the cap fastener from impeding the swiveling movement on the front wheel and of the front link. Both front wheels and front links are similarly mounted as just described.

FIG. 3 also shows that the rear wheel 36 is carried by a wheel housing 38 which in turn is carried by a vertical pin 40 which is fixed to the wheel housing at the lower end of the pin. In order to securely attach both the rear wheel and the rear link, the pin 40 is passed upwardly through aligned vertical holes which are provided in the rear end 14 of side rail 10, and in the outer end 30 of rear link 24. A cap fastener 44 is driven onto pin 40 to hold it against downward displacement and to pivotally secure the rear link to the side rail.

The rear wheel 36 is not intended to swivel and is fixed to roll in alignment with the side rail. This alignment is accomplished by inserting a pop rivet 46 through a transverse hole in pin 40 and by fitting the pop rivet with a spacer 48. Because of the presence of the transverse pop rivet and spacer, vertical pin 40 cannot revolve within the hollow side rail about its vertical axis. Thus, the rear wheel is fixed in its rolling direction. Both rear wheels and rear links are similarly mounted as just described.

Suitcases or other luggage can be loaded onto the rectangular platform formed by the side rails and the front and rear links. Preferably, the suitcases are loaded upright and perpendicular to the side rails, as shown in FIG. 1, although with three or more suitcases, they should be piled on their sides. It will be seen in FIG. 3 that, in order to obtain a low center of gravity, the extreme top of the luggage carrier extends above the ground a distance which is only approximately twice the caster wheel diameter, and in no event more than three times the diameter. This feature reduces the likelihood of tipping.

In order to retain the luggage on the platform and to pull the luggage carrier from place to place, a bridle-type cord arrangement is provided. Preferably, a nonelastic pull cord 50 is looped from adjacent to the front end 12 of one side rail 10 to adjacent to the front end 12 of the other side rail 10. A handle 52 is affixed to the mid-point of the looped pull cord 50 and the ends of the pull cord are knotted or otherwise fixed within the tubular side rails. A traveler pulls the luggage carrier by walking ahead and pulling the carrier behind him in wagon-fashion.

The tie-down cords 54 are looped from the rear ends 14 of side rails 10 to the tee fittings 56. Tie-down cords 54 are so-called elastic "shock" cords and are of sufficient length to stretch over the luggage in order to hold it on the platform. The ends of tie-down cords 54 are knotted at the front within tee fittings 56 and are knotted at the rear within the tubular side rails. Alternatively, the tie-down cords 54 could run in two loops between the front ends 12 and the rear ends 14 of the side rails, and the pull cord 50 could be run between the two tee fittings 56. Either arrangement will operate successfully, although the preferred embodiment utilizes the former arrangement.

The luggage carrier is normally maintained in the folded position shown in FIGS. 2–3. The tie-down cords and pull cord are usually wrapped around the side rails and the slender package is stowed in a flexible carrying case, similar to the type conventionally used to stow folding umbrellas. Then, when it is desired to transport luggage, the luggage carrier is removed from its carrying case and is unfolded to the use position shown in FIG. 1. The suitcases are placed upon the rectangular platform and the tie-down cords are looped over the suitcases as shown. The traveler can then pull the handle as if he were pulling a child's wagon. The luggage carrier will follow the traveler with very little effort. The loaded luggage carrier resists tipping because of the high fulcrum location of the pull cord. Also, the loaded luggage carrier is much easier to use than two wheeled carriers which must be positioned vertically or horizontally in their rest positions and then tipped or lifted to their travel positions. It may be quite difficult to tip or lift a heavy load. In contrast, the present invention is always in the travel position.

The modified embodiment of the luggage carrier of this invention is shown in FIG. 4. It is designed to be a smaller carrier and has only one feature which is different from the preferred embodiment. This feature is that instead of having pairs of folding front and rear links, the modified embodiment has a single front link 58 and a single rear link 60. This feature causes the modified luggage carrier to fold into the non-use position differently from the preferred luggage carrier.

The modified carrier in use has the same rectangular platform as the preferred carrier. In folding, the modified carrier is shifted first into a parallelogram shape and then the side rails are brought together. In all other ways, the two embodiments are the same.

In conclusion, the luggage carrier of this invention provides a very convenient accessory for the traveler. It can be used easily, quickly and with low effort. It is also inexpensive to manufacture and should make an attractive gift item for specialty shops as well as a standard stock item for department stores, luggage stores and mail order houses.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A folding portable luggage carrier comprising:
    a. a horizontal pair of spaced-apart side rails having vertical apertures adjacent to their front and rear ends;
    b. a horizontal pair of front links pivoted together at their inner ends, said front links having vertical apertures adjacent to their outer ends;
    c. a horizontal pair of rear links pivoted together at their inner ends, said rear links having vertical apertures adjacent to their outer ends;
    d. said front link outer end apertures being vertically aligned with said side rail front end apertures, and said rear link outer end apertures being vertically aligned with said side rail rear end apertures;
    e. a pair of swiveling front casters having their vertical shafts extending upwardly through said aligned front link-side rail apertures, and front retaining means engaging said caster shafts for fixing said caster shafts against downward displacement from said aligned apertures;
    f. a pair of non-swiveling rear casters having their vertical shafts extending upwardly through said aligned rear link-side rail apertures, and rear retaining means engaging said caster shafts for fixing said caster shafts against downward displacement from said aligned apertures;
    g. said front links and said rear links folding towards each other so that their pivoted inner ends converge and said side rails draw together in parallel relation to form a folded, portable compact unit having the same overall length as said side rails, said front links and said rear links unfolding away from each other so that their pivoted inner ends diverge and said side rails extend apart in parallel relation to form a rectangular luggage carrying platform;
    h. the distance from the bottom of said casters to the extreme top of said luggage carrier being less than three times the diameter of said casters;
    i. tie-down means affixed to said luggage carrier for securing luggage on the luggage carrying platform; and
    j. pull cord means affixed to said luggage carrier and adapted to be gripped for pulling said luggage carrier across a surface.

2. The folding luggage carrier of claim 1 wherein said side rails are tubular.

3. The folding luggage carrier of claim 1 wherein said front links and said rear links each have stop means mounted thereon adjacent the inner end pivot point, said stop means acting to prevent said front links and said rear links from folding away from each other beyond a preset distance.

4. The folding luggage carrier of claim 1 wherein said tie-down means includes elastic cord lengths.

5. The folding luggage carrier of claim 1 wherein said tie-down means is affixed to said pull cord means.

6. The folding luggage carrier of claim 1 further having:
   a. front wheel mounting means for each said front wheel including a hollow rivet extending through and pivotally attaching the outer end of the said front link to the front end of said side rail, a wheel housing carrying said front wheel, a vertical pin fixed to said wheel housing and extending upwardly therefrom, said pin being inserted upwardly through said hollow rivet, and fastening means engaging the upper end of said pin and limiting its downward displacement out of said rivet, said pin being free to rotate about its vertical axis; and
   b. rear wheel mounting means for each said rear wheel including a wheel housing carrying said rear wheel, a vertical pin fixed to said wheel housing and extending upwardly therefrom, said pin being inserted upwardly through vertically aligned holes formed in the outer end of said rear link and the rear end of said side rail to pivotally attach said rear link to said side rail, fastening means engaging the upper end of said pin and limiting its downward displacement out of said holes, and means engaging said pin to prevent said pin from rotating about its vertical axis.

* * * * *